United States Patent [19]

Stauffer

[11] 4,002,468
[45] Jan. 11, 1977

[54] SCRAP SMELTING PROCESS
[75] Inventor: William O. Stauffer, Moraga, Calif.
[73] Assignee: Swiss Aluminium Limited, Chippis, Switzerland
[22] Filed: Apr. 28, 1975
[21] Appl. No.: 571,983
[52] U.S. Cl. .............................. 75/68 R; 75/65 R; 266/901
[51] Int. Cl.² ........................................ C22B 21/00
[58] Field of Search .................... 75/68 R, 65 R; 266/33 R, 33 S, 901; 432/253

[56] References Cited

UNITED STATES PATENTS

| 3,633,666 | 1/1972 | Sparks | 266/33 R |
| 3,873,305 | 3/1975 | Claxton et al. | 75/68 R |

Primary Examiner—M. J. Andrews
Attorney, Agent, or Firm—David A. Jackson; Robert H. Bachman

[57] ABSTRACT

A process for melting scrap metal is disclosed which comprises superheating a quantity of molten metal to at least 1400° F in a metal heating furnace, forming a scrap melt by placing the superheated metal in contact with a quantity of scrap metal to submerge the scrap metal therein, removing impurities from said scrap melt and placing said scrap melt within said heating furnace and then repeating said superheating step. The apparatus in accordance with the present invention comprises a metal heating furnace provided with an improved heat transfer means comprising thermally conductive refractory tiles located between the heat source of said furnace and said molten metal.

8 Claims, 7 Drawing Figures

SCRAP SMELTING PROCESS

BACKGROUND OF THE INVENTION

The present invention generally relates to the melting of scrap metal in contact with molten metal, and in particular, to the melting of solid aluminum scrap in a continuous process.

In the melting of solid scrap metal, such as, for example, aluminum, the solid material is desirably heated as rapidly as possible to achieve the highest possible melting rate. In current practice, the solid metal is introduced to a molten body of metal within a furnace generally in a ratio of about 2 pounds of solid material to 1 pound of molten metal, after which heat is applied to the mixture conventionally from above, to melt the solid component.

In the above practice, many drawbacks exist that prevent rapid heat input to the solid charge of metal. Specifically, it is difficult to rapidly transfer heat into solid pieces of metal without producing high surface temperatures therein, resulting in accelerated oxidation and a substantial oxide skim which floats on the melt and insulates the melt from the transfer of further heat. Also, a high percentage of melt loss occurs with scrap comprising finely divided material, which results from the large surface area of such material.

An additional problem which occurs with metals such as aluminum, is present when the metal is heated in a relatively deep bath. In spite of the high thermal conductivity of aluminum, heat loss from the bath through the furnace wall containing the bath creates temperature gradients or thermal stratification in which the surface temperature can be as high as 100° F greater than the metal temperature at the bottom of the bath. Such high temperature causes rapid oxidation which, as noted above, serves to insulate the melt and further reduces melting rate while increasing melt loss. The inability to efficiently distribute heat in the furnace results in the build up of temperatures up to 3,000° F or greater above the metal level which causes the furnace linings to deteriorate and necessitates the reduction of heat input.

It has been proposed to employ separate metal charging and melting bays or compartments connected by a loop through which molten metal is circulated. In this technique, the improved heat transfer between the moving molten metal and the solid charge pieces is utilized. Heat is applied to the molten metal in one compartment so that it can be transferred to the solid charge in the other compartment. Even these techniques, however, have had limited success, as, when heat is not efficiently utilized, the same problems result which were discussed above in connection with single charging furnaces.

One solution which has been proposed to the problems encountered in the separate charging and melting technique, is to maintain a melt body at a depth of from 1 to 3½ feet whereby heat is applied to the upper melt surface while a cooled molten metal stream is continuously introduced across the bottom portion of the melt and upwardly through an arc to effect a sweep-flow reversal of the upper melt region. At the same time, a heated stream of metal is continuously removed from the upper regions and introduced into a charging receptacle, where solid metal is introduced at a weight ratio of at least one part solid metal to at least 10 parts molten metal. This technique is fully discussed in U.S. Pat. No. 3,770,420 to Spear et al.

The present invention provides a different approach to the problem discussed above than that taken by Spear et al., and is believed to result in a greater economy and efficiency of operation.

SUMMARY OF THE INVENTION

In accordance with the present invention, a process for the melting of scrap metal is disclosed which comprises conducting a flow of molten metal into a shallow bath located within a metal heating furnace, whereby said molten metal is substantially covered by a plurality of thermally conductive ceramic tiles, superheating said molten metal thereto to at least 1400° F, forming a scrap melt by directing the superheated metal into contact with a quantity of solid scrap and submerging the scrap within the superheated metal, and charging the resulting melt into the metal heating furnace and repeating the superheating step. Conveyance of the molten metal is achieved by passage from the heating furnace to a circulating system where the metal may be pumped to either the scrap melting station, a bypass conduit leading directly to the furnace, or simply out of the scrap melting assembly to an appropriate receptacle for solidification or other treatment.

The apparatus of the present invention comprises a scrap melting assembly comprising a metal heating furnace provided with an improved heat transfer means comprising thermally conductive refractory tiles located between the heat source of the furnace and the upper surface of the molten metal. The assembly of the invention includes a circulating system which may direct the molten metal through a plurality of channels to different locations within the assembly. One channel of the circulating system is connected to a scrap metal melting station where solid metal is charged. The scrap melt resulting is directed by this channel to a metal cleaning station for removal of impurities and then continues to connect to the heating furnace to form a closed loop arrangement.

The use of the thermally conductive tiles in the heating furnace of the present invention, in conjunction with the employment of a shallow molten metal bath therein, has been found to provide effective heat transfer without excessive fuel consumption and surface oxidation. This increased fuel efficiency and heat transfer results in improved rate of scrap conversion or melting and a higher percentage of metal recovered.

An additional advantage of the furnace of the present invention is that the shallow metal bath possesses a reduced melt capacity, known as "hold-up volume", of approximately 5,000 pounds, which facilitates the rapid change of the metal charge to a different alloy. Conventional furnaces possess "hold-up" capacities of from about 30,000 to 50,000 pounds, and require extended time to empty and ready for the different metal. This ease of change is available without sacrifice in rate of metal production.

Accordingly, it is a principal object of the present invention to provide a method for the melting of solid metal scrap in molten metal which achieves increased fuel efficiency and metal output with reduced melt loss.

It is a further object of the present invention to provide a method as aforesaid which reduces melt loss due to surface oxidation of the melt.

It is a yet further object of the present invention to provide a method as aforesaid which utilizes an improved heat transfer means in the metal heating furnace.

It is a still further object of the present invention to provide an apparatus for use in the method as aforesaid which employs a heating furnace having a shallow bath and conductive ceramic tiles covering the melt.

It is a still further object of the present invention to provide an apparatus as aforesaid which facilitates the rapid conversion to the processing of different metals.

Further objects and advantages will be apparent to those skilled in the art from a consideration of the description which follows with reference to the accompanying drawings.

DETAILED DESCRIPTION OF THE PREFERRED EMBODIMENTS

In accordance with the present invention, the foregoing objects and advantages are readily obtained.

Specifically, the present invention relates to a process for the melting of scrap metal, such as aluminum, comprising conducting a flow of molten metal into a shallow path within a metal heating furnace, whereby said molten metal is substantially covered by a plurality of thermally conductive ceramic tiles. The molten metal is superheated to at least 1400° F and is then transported into contact with a quantity of solid scrap and forms a scrap melt. The scrap melt is cleaned to remove any entrained impurities, and then charged into the metal heating furnace where it is superheated to the above temperature. The molten metal leaving the furnace is then conveyed by a circulating system located at the exit port of the heating furnace in any one of three directions, those being, toward the scrap melting station, through a bypass conduit returning directly to the heating furnace or simply out of the scrap melting assembly by overflow from the circulating system to an appropriate receptacle where it may be solidified and/or further processed as desired.

The method of the present invention is advantageously practiced by the use of a unique scrap melting assembly which comprises a metal heating furnace provided with an improved heat transfer means comprising thermally conductive refractory tiles located between the heat source of the furnace and the upper surface of the molten metal. A clearer understanding of the assembly and method of this invention can be gained from reference to FIG. 1 which comprises a schematic diagram of the melting assembly.

Figure 1:
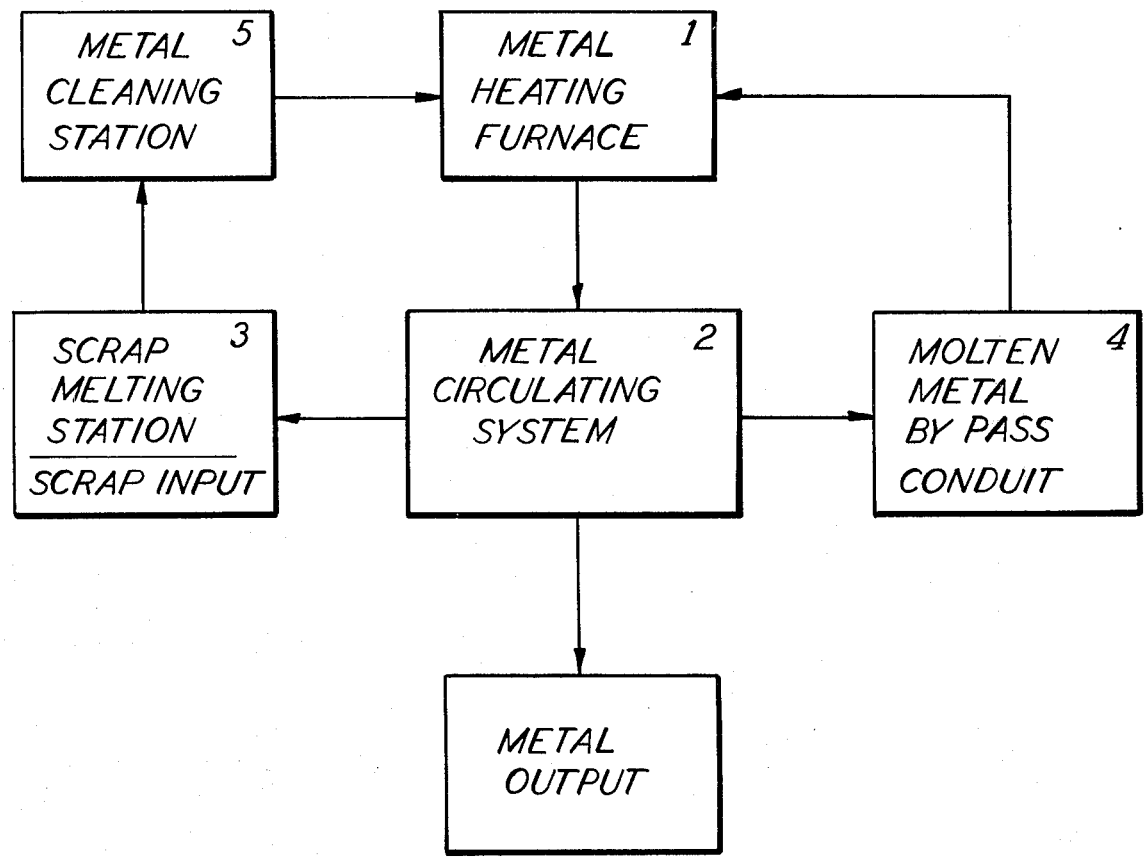
FIG. 1 is a schematic flow diagram illustrating the scrap melting assembly of the present invention.

Referring to FIG. 1, molten metal such as molten aluminum is located within the metal heating furnace, labeled 1, where it is brought to a temperature of at least 1400° F and is thus superheated. The furnace is generally of similar structure to standard open hearth furnaces such as are known in the art, and may use oil or gas burners, or those known as oxygen fuel burners as well. The structure of the furnace of this invention differs from that of the standard open hearth in that the path of the metal to be heated is of a minimum depth, such as, for example, from about one-half inch to about 1 inch. This shallow bath of molten metal is covered at its top surface by a plurality of thermally conductive refractory tiles which may vary in configuration and are provided with a shallow cavity on their underside through which the molten metal may pass. The above will be better understood from a thorough discussion of the furnace of this invention which will appear hereinbelow with reference to FIGS. 2–4.

After completion of the superheating treatment, the molten metal is removed from the furnace through a suitable exit port and flows to a circulating system, labeled 2, which, in actual practice, may comprise a pump within a well located in proximity to the furnace exit port. The circulating system comprises a series of connecting channels or conduits which may conduct the molten metal in a variety of directions. Thus, the metal may be directed through the closed loop of the assembly where it may be conveyed to the scrap melting station or to a molten metal bypass running parallel thereto. In the alternative, the metal may be pumped out of the assembly to an appropriate receptacle for further processing, or may be drawn off to a holding furnace or casting mold on an overflow basis, such as when the volume of molten metal exceeds the holding capacity of the well. The circulating system comprising the well, pump and associated channels may comprise equipment which is generally known in the art, and does not, per se, constitute a novel feature of the present invention. It is rather, however, the cooperation of the circulating system with the other elements of the scrap melting assembly which is considered to be an embodiment of the present invention.

As noted above, the molten metal may be conveyed to a scrap melting station 3 which, in accordance with the present invention, may be located adjacent a bypass conduit 4. Therefore, in one embodiment, molten metal may flow to the melting station comprising a shallow hearth area provided with a grooved floor plate. Solid scrap in bailed form is placed upon the grating and molten metal is passed therebelow through channels provided in the grating in order to achieve the melting of the bailed material. The molten metal bypass and the melting station branch off from a common conduit so that the bypass runs adjacent the melting station whereby molten metal approaching the melting station may flow in either direction.

In a preferred embodiment of the present invention, the scrap metal melting station comprises a melting bowl into which solid scrap is fed from a storage area or the like by a conveying means conventional in the art. The conveying means may be provided with motor actuation possessing a speed control, and melting rate may thereby be controlled by the speed of addition of the scrap to the molten metal.

The melting bowl comprises a tapered crucible possessing an opening at its bottom. Molten metal is pumped through a channel which empties into the crucible at the top thereof. The molten metal flows helically down the inside surface of the crucible and drains through the aforementioned bottom opening. The flow of molten metal engages the solid scrap introduced by the conveyor, and the latter is completely melted due to the direct contact with the flowing hot metal stream. The above described apparatus, including the crucible and the conveyor, are representative of conventional equipment which is readily available in the art, and does not, per se, form a part of the invention.

The melt issues from the melting station, such as, for example, through the bottom of the crucible, and is then conveyed through the channel to a cleaning station 5 which may comprise a dross skimming bay of the type conventional in the smelting art. Thus, the metal enters a bay having placed therein a plurality of baffles which serve to detain dross or a slag which has formed on the surface of the melt, so that it can be skimmed off by means conventional in the art, such as, the manual operation of rakes and the like. In addition to the skimming of dross, operations such as fluxing and cleaning may be conducted at this station. The metal thus purified is then charged to the heating furnace and the superheating is then conducted.

As noted earlier, the metal circulating system provides alternate channels of travel for the molten metal. Thus, metal issuing from the heating furnace may either be directed through the system for scrap melting or directly returned to the heating furnace, or may be discharged to a suitable receptacle for further processing and the like. Accordingly, the circulating system may provide an output channel similar in operation to the channels providing molten metal to the scrap melting station and the bypass conduit, or in an alternate embodiment, may determine metal output by directing molten metal away from the apparatus that constitutes overflow from the well of the circulating system. The method and apparatus of the present invention encompass both techniques and should, accordingly, not be limited to any particular method of operation.

Figure 2:
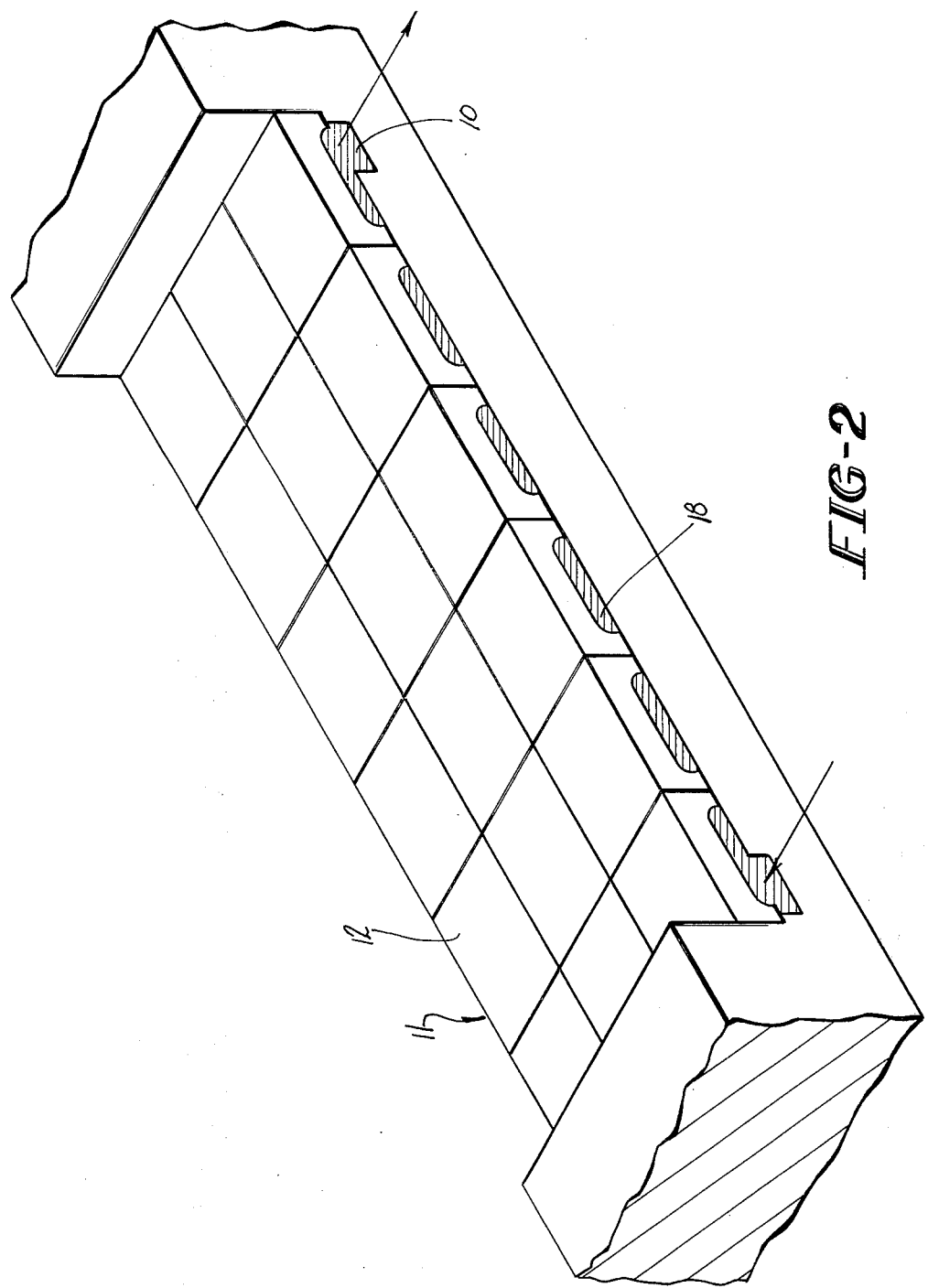
FIG. 2 is a schematic perspective view illustrating the hearth of the metal furnace of the present invention.

One of the primary features of the present invention comprises the provision of an improved heat transfer means located within the metal heating furnace. The transfer means comprises refractory tiles which are located between the heat source of the furnace and the trough or bay holding the incoming molten metal. Referring now to FIG. 2, a perspective illustration of the hearth of the metal furnace of the present invention is shown. In the illustration, cold metal flows in through the trough labeled 10 and is permitted to collect to a depth of from one-half inch to 1 inch. The employment of the aforenoted shallow depth is one of the characterizing features of the furnace, as it has been found that optimal heat transfer may be achieved thereby. The minimum depth eliminates the aforenoted problem of temperature gradients or variations which may characteristically exist when heat is applied to a molten body of greater depth by direction against one surface, and thereby facilitates faster heating rates and greater uniformity of melt temperature.

In addition to the shallow depth of the melt bath in the hearth, the invention comprises the employment of conductive refractory tiles 11 which are of a particular composition and specially configured to optimize heat transfer from the heat source of the furnace to the melt. In practice, the upper surface of the melt resides beneath tiles 11 and in contact with the lower surface thereof, not shown in this figure, so that heat is directed initially against the tiles and conducts therethrough to the melt. As noted earlier, the heat source employed in the furnace of the present invention may comprise oil, gas or oxygen fuel burners such as are conventionally employed in open hearth furnaces.

The principle underlying the present invention relates to the ability of certain materials to absorb radiant thermal energy, which may be generally defined as their surface emissivity. Surface emissivity is measured in relation to a body capable of almost complete energy absorption known as a black body. Some materials, such as aluminum, absorb little, if any, energy rather, reflecting the preponderance thereof, and, accordingly, possess a low surface emissivity, which, in part, accounts for the aforenoted temperature gradients which are present in molten aluminum baths of any considerable depth. By contrast, the tiles employed in the present invention are almost black bodies as they are capable of absorbing and holding, in large part, the entire energy output of the furnace heat source. Further, their composition enables them to efficiently conduct the stored heat energy to the circulating metal. As a result, energy transfer is more rapid, and energy loss minimized, as the initial energy receiving surface is absorptive and not reflective. Desired melt temperature is achieved with a reduced energy expenditure due to the intermediary function of the tiles. Also, furnace linings are frequently replaced from burn-out due to excessive burner temperatures employed to compensate for the reflectance of the melt. Finally, the surface cover provided by the tiles minimizes oxidation loss, and consequently enhances the percent of metal recovery. As the tiles of the invention must be capable of withstanding the elevated temperatures of the furnace, while retaining their ability to absorb and conduct heat energy efficiently, they are preferably prepared from a refractory material. Though a large number of well-known refractory compositions may be employed, certain materials have been found useful, specifically the silicon nitride- and silicon oxynitride-bonded carbides of silicon. Though these materials have been noted, the invention contemplates that additional refractory materials possessing the requisite properties would be includable herein.

Referring again to FIG. 2, the configuration of tiles 11 represents one embodiment of the present invention. The upper surfaces 12 are flat and are placed at a level above the surface of the melt to be available for absorption of heat radiating from the burners above, not shown. The lower surface of tiles 11 are likewise substantially flat with the exception of downturned marginal portions 13 defining paired ridges 14 which may extend either the length or the breadth of the tiles, and provide passageways enabling molten metal to contact substantially the entire lower surface of tiles 11 to receive thermal energy stored therein. Generally, tiles 11 are situated in the furnace so that ridges 14 are parallel to the flow of metal.

Tiles 11 are dimensioned to promote heat transfer and are provided with a reduced thickness, in respect to their surface area. Thus, the tiles are prepared in lengths of about 18 inches, with widths which may vary from 6 to 12 inches, and an overall thickness of up to about 5 inches. The thickness of the tile measured from the lower surface to upper surface 12, may preferably be about 2 inches to provide optimal heat transfer.

When installed in the furnace of the present invention, the furnace tiles are situated so as to cover both the bath area and the trough provided for the circulating of molten metal into and out of the hearth area. Thus, referring back to FIG. 2, the trough 10, which serves to direct cold metal in as well as directing hot metal out, is covered by tiles in the same manner as bath area 18.

Figure 3A:
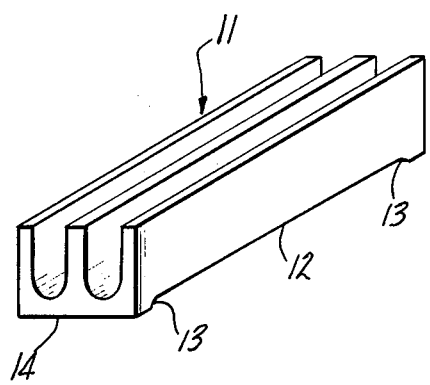
FIGS. 3A–3D are perspective views illustrating variations in configuration of the conductive refractory tiles of the present invention.
Figure 3B:
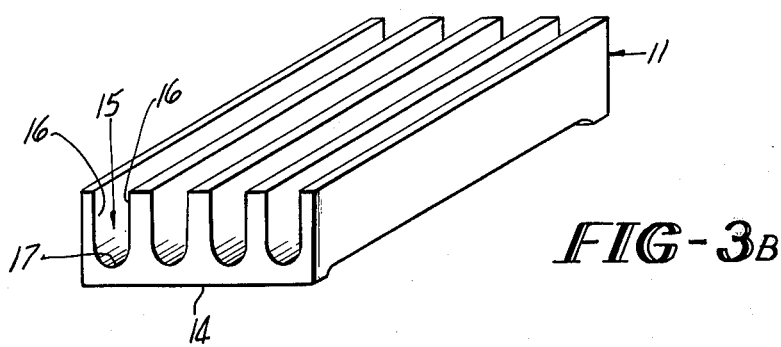
Figure 3C:
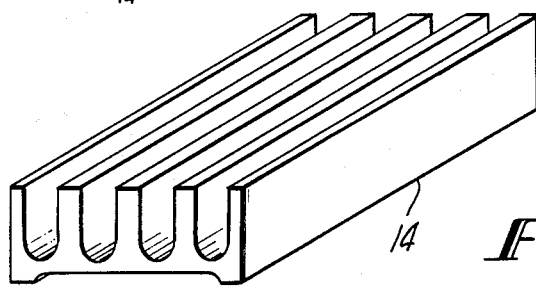
Figure 3D:
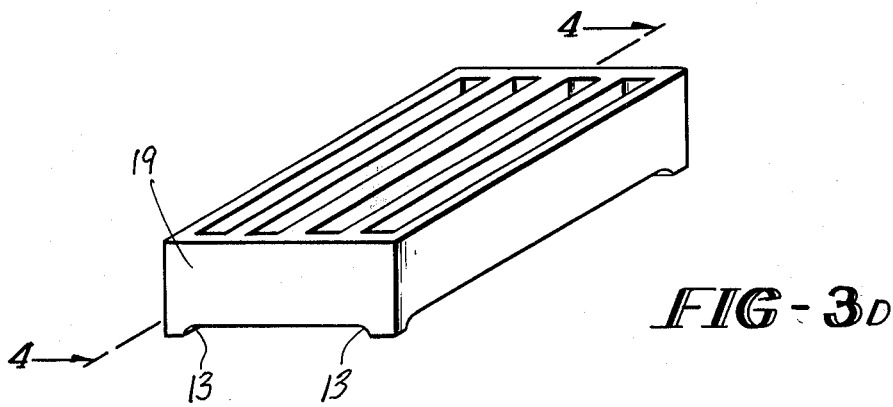
Figure 4:
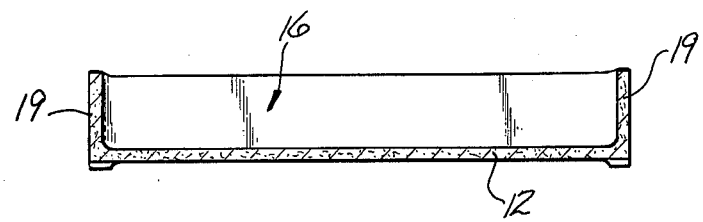
FIG. 4 is a side sectional view taken through line 4—4 of FIG. 3D.

Other tiles useful in the present invention are shown in more detail in FIGS. 3A–4. In FIG. 3A, the upper surface 12 is defined by longitudinally extended grooves 15 which comprise side walls 16 and U-shaped end wall 17. Grooves 15 are generally 1½ inches in depth, and provide an increased absorptive surface area for the impinging heat energy which enables the lower surface of the tile to provide a higher level of heat energy to the circulating melt.

As noted earlier, the tiles of the present invention may assume a variety of configurations, as an installation of the type contemplated herein requires tiles of all sizes.

Thus, referring again to FIG. 3A, a tile configuration is shown with a reduced width and defining only two grooves. This structure is generally about 18 inches. The tile illustrated in FIG. 3B is most commonly used due to its increased width dimension. The structure illustrated in FIG. 3C differs from that of 3B in that the direction of ridges 14 is longitudinal rather than lateral, while the structure illustrated in 3D possesses marginal portions 13 at its corners, which are unconnected by a ridge structure. In addition, the tile of FIG. 3D possesses full side walls 19 which terminate the passageways of grooves 15 on either end. As is more clearly illustrated in FIG. 4 taken through line 4—4 in FIG. 3D, side walls 19, which are continuous with the wall defined by upper surface 12, serve as a barrier to prevent the flow of molten metal into grooves 15 in the event that the melt unexpectedly rises above the level defined by the lower surfaces of the tiles. Thus, molten metal is not entrained within grooves 15, where it may prevent heat transfer and undergo undesirable oxidation.

As presently designed and operating, the assembly of the present invention is capable of the continuous production of from 70 to about 200 pounds of molten metal per minute. The molten metal heating furnace possesses a hearth area of approximately 130 square feet, roughly equivalent in size to a conventional 30,000 pound capacity furnace. As stated earlier, the total capacity of the entire assembly is approximately 5,000 pounds of metal, and molten metal is recirculated at a rate approximately 2,000 pounds per minute.

In sum, the provision of the shallow bath area together with the refractory tiles of the present invention serves to transfer heat to the molten metal in a manner which is both rapid and efficient. Likewise, the incidence of furnace burn-out and reduced capacity which result from the inability of the metal to heat to a uniformly high temperature are hereby reduced or eliminated and increased productivity is thereby achieved with a lower maintenance cost.

It is to be understood that the invention is not limited to the illustrations described and shown herein which are deemed to be merely illustrative of the best modes of carrying out the invention, and which are susceptible of modifications of form, size, arrangement of parts and details of operation, but rather is intended to encompass all such modifications which are within the spirit and scope of the invention as set forth in the appended claims.

What is claimed is:
1. A process for melting a scrap metal in molten metal which comprises:
    A. conducting a flow of a quantity of molten metal through a metal heating surface to form a shallow bath of up to 1 inch in depth therein, wherein said bath is covered by a plurality of thermally conductive ceramic tiles and wherein a heating source is located above said bath and the upper surface of said tiles;
    B. superheating said metal to at least 1400° F in said furnace;
    C. removing the superheated metal of step B from said furnace and placing said removed superheated metal in contact with a quantity of scrap metal whereby said scrap metal is submerged therein and melted, and impurities are generated, thereby forming a scrap melt;
    D. removing said impurities from the scrap melt of step C; and
    E. returning the melt of step D to said furnace and then repeating step A.
2. The process of claim 1 wherein said bath ranges in depth from about ½ to about 1 inch.
3. The process of claim 1 wherein said ceramic tiles are prepared from a refractory material selected from the group consisting of the silicon nitride-silicon carbides and the silicon oxynitride-silicon carbides, and mixtures thereof.
4. The process of claim 3 wherein said ceramic tiles comprise substantially flat upper and lower surfaces, wherein said lower surface is provided at parallel edges thereof with two vertically extended ridges.
5. The process of claim 4 wherein said upper surface is provided with longitudinally extended parallel grooves.
6. The process of claim 1 wherein a portion of said superheated metal is returned directly to said furnace from said circulating system.
7. The process of claim 1 wherein the impurities of step D comprise slag and dross which are manually removed in a skimming operation.
8. The process of claim 1 wherein steps A–E are continuously repeated a plurality of times.

* * * * *